United States Patent
Maalouf et al.

(10) Patent No.: US 12,162,621 B2
(45) Date of Patent: Dec. 10, 2024

(54) FUEL CONDITIONING SYSTEM AND METHOD CONFIGURED TO SUPPLY AN AIRCRAFT TURBINE ENGINE WITH FUEL FROM A CRYOGENIC TANK

(71) Applicant: SAFRAN, Paris (FR)

(72) Inventors: Samer Maalouf, Moissy-Cramayel (FR); Hugo Pierre Mohamed Jouan, Moissy-Cramayel (FR); Thierry Sibilli, Moissy-Cramayel (FR); Pierre-Alain Marie Cyrille Lambert, Moissy-Cramayel (FR); Ibrahima Noba, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/567,408

(22) PCT Filed: Jun. 10, 2022

(86) PCT No.: PCT/EP2022/065799
§ 371 (c)(1),
(2) Date: Dec. 6, 2023

(87) PCT Pub. No.: WO2022/263307
PCT Pub. Date: Dec. 22, 2022

(65) Prior Publication Data
US 2024/0270402 A1    Aug. 15, 2024

(30) Foreign Application Priority Data

Jun. 14, 2021  (FR) .................................... 2106216

(51) Int. Cl.
*B64D 37/34*   (2006.01)
*F02C 7/232*   (2006.01)
*F02C 9/40*    (2006.01)

(52) U.S. Cl.
CPC .............. *B64D 37/34* (2013.01); *F02C 7/232* (2013.01); *F02C 9/40* (2013.01)

(58) Field of Classification Search
CPC .............. B64D 37/34; F02C 3/20; F02C 3/22; F02C 7/22; F02C 7/222; F02C 7/232;
(Continued)

(56) References Cited

U.S. PATENT DOCUMENTS

| | | | | | |
|---|---|---|---|---|---|
| 8,276,384 | B2* | 10/2012 | Negre | ....................... | F02G 1/04 60/671 |
| 8,424,574 | B2* | 4/2013 | Whiteman | .............. | F17C 5/007 141/47 |
| 11,788,494 | B2* | 10/2023 | Seba | .................. | F02M 21/0245 123/525 |

(Continued)

FOREIGN PATENT DOCUMENTS

| DE | 102018221323 | | 6/2020 | | |
|---|---|---|---|---|---|
| KR | 20190028126 A | * | 9/2017 | ............. | B63H 21/38 |

(Continued)

OTHER PUBLICATIONS

International Search Report for PCT/EP2022/065799 dated Sep. 1, 2022, 4 pages.
International Search Report for FR2106216 dated Apr. 12, 2022, 2 pages.

*Primary Examiner* — Alain Chau
(74) *Attorney, Agent, or Firm* — Rankin, Hill & Clark LLP (57) ABSTRACT

A fuel conditioning system configured to supply an aircraft turbine engine with fuel from a cryogenic tank. The fuel circuit comprising a buffer tank for supplying the turbine engine and a plurality of compression modules configured to supply the buffer tank, each compression module comprising an elementary tank of fixed volume, an elementary heat source configured to increase the temperature of the fuel in the elementary tank in an isochoric manner, an inlet valve connecting the elementary tank to an upstream part of the
(Continued)

fuel circuit, an outlet valve connecting the elementary tank to the buffer tank, and a venting valve connecting the elementary tank to the cryogenic tank via a return circuit in which a gaseous stream circulates.

15 Claims, 10 Drawing Sheets

(58) Field of Classification Search
CPC .... F02C 7/224; F02C 9/40; F17C 2223/0161; F17C 2265/066; F17C 2227/0157; F17C 2227/0164; F02M 21/0221
See application file for complete search history.

(56) References Cited

U.S. PATENT DOCUMENTS

| | | | | |
|---|---|---|---|---|
| 2010/0139777 | A1* | 6/2010 | Whiteman | F17C 5/007 |
| | | | | 137/255 |
| 2012/0317995 | A1* | 12/2012 | Brunnhofer | F04B 53/08 |
| | | | | 62/45.1 |
| 2016/0201852 | A1* | 7/2016 | Whiteman | F17C 5/06 |
| | | | | 137/571 |
| 2020/0088098 | A1 | 3/2020 | Roberge | |
| 2022/0412637 | A1* | 12/2022 | Butterworth | F25B 9/145 |
| 2023/0212983 | A1* | 7/2023 | Sibilli | F02C 7/14 |
| | | | | 60/730 |

FOREIGN PATENT DOCUMENTS

| | | |
|---|---|---|
| WO | 2014105335 | 7/2014 |
| WO | 2019102156 | 5/2019 |

* cited by examiner

FUEL CONDITIONING SYSTEM AND METHOD CONFIGURED TO SUPPLY AN AIRCRAFT TURBINE ENGINE WITH FUEL FROM A CRYOGENIC TANK

TECHNICAL FIELD

The present invention relates to the field of aircraft comprising turbine engines supplied by fuel stored in a cryogenic tank.

It is known to store fuel, in particular hydrogen, in liquid form to limit the bulk and mass of the tanks of the aircraft. For example, the fuel is stored at a temperature of the order to 20 to 22 Kelvin (−253 to −251° C.) in a cryogenic tank of the aircraft.

Figure 1:
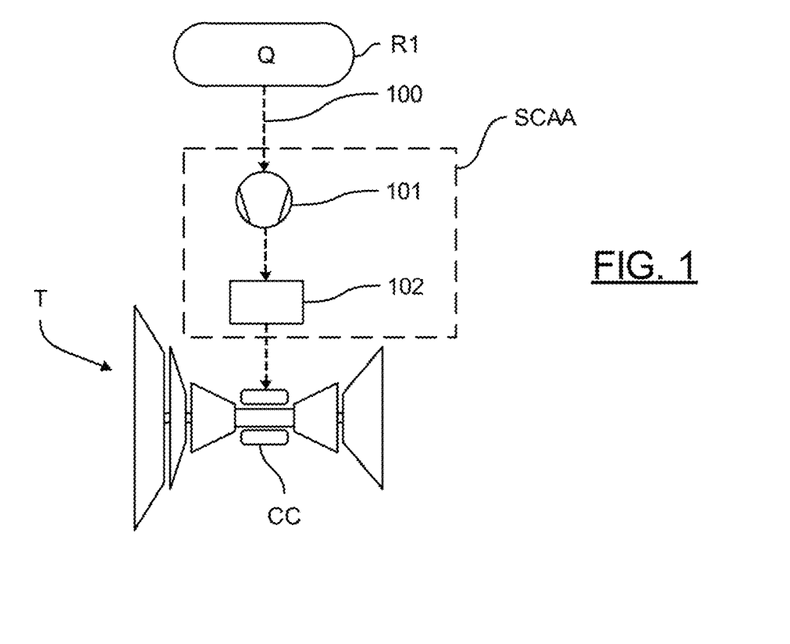
FIG. 1 is a schematic representation of a fuel conditioning system according to the prior art.

In order to be able to be injected into the combustion chamber of a turbine engine, the fuel must be conditioned, i.e. pressurized and heated, in order to enable optimal combustion. A conditioning is for example necessary to reduce the risk of icing of the water vapor contained in the air that circulates in the turbine engine, in particular, at the level of the fuel injectors of the turbine engine. With reference to FIG. 1, a conditioning system SCAA according to the prior art is represented comprising a fuel circuit 100 connected at the inlet to a cryogenic tank R1 and at the outlet to the combustion chamber CC of a turbine engine T. A fuel flow Q circulating from upstream to downstream in the fuel circuit 100 and successively passes through a mechanical pump 101 and a heating module 102.

In practice, to perform the pumping, a mechanical pump 101 of the positive displacement or centrifugal type may be used, also called high-pressure pump, which operates at pressures of 50 bars. Such a mechanical pump 101 has many drawbacks in terms of sealing, lubrication and efficiency. A mechanical pump 101 notably requires a large amount of energy to be able to ensure compression. At present, the mechanical pumps 101 that can be used with cryogenic tanks do not allow operation over a wide throughput/pressure range for high efficiency. Also, in practice, it is necessary to use a mechanical pump 101 of which the operating point is not optimal and which requires moving away from the recommended operating range of said mechanical pump 101, which increases the stresses applied to the mechanical pump 101 and reduces its efficiency. Thus, such a mechanical pump 101 cannot optimally adapt its throughput as a function of the needs of the turbine engine.

The invention thus aims to eliminate at least some of these drawbacks by proposing a novel fuel conditioning system enabling a compression and a heating with better efficiency and greater reliability.

In an incidental manner, a system is known in the prior art for pressurizing fuel in elementary tanks, each of which is pressurized by connecting to a buffer tank having a high pressure. The fuel from each elementary tank is then driven out of the elementary tank to be pressurized by a mechanical pump and a heat exchanger. The pressure required is high and imposes the use of a mechanical pump and a large capacity heat exchanger. The aforementioned drawbacks remain.

Again in an incidental manner, a system for heating fuel in a container prior to its injection into a buffer tank is also known in the prior art. The container is equipped with numerous sensors to allow cold fluid to be added or the container to be emptied in the event of uncontrolled temperature rise. Such an architecture presents a significant risk of backflow out of the container given that the buffer tank has a higher pressure than the inlet tank, which affects safety.

Thus, it is necessary to provide a high-pressure pump, which has the aforementioned drawbacks.

Further, in the event of too high pressure and activation of a safety mechanism, the supply to the buffer tank must be stopped, which means that the buffer tank must be oversized in order to take into account periods of non-supply.

SUMMARY

To this end, the invention relates to a fuel conditioning system configured to supply an aircraft turbine engine from fuel stemming from a cryogenic tank, the conditioning system comprising a fuel circuit connected at the inlet to the cryogenic tank and at the outlet to the turbine engine, a fuel flow circulating from upstream to downstream in the fuel circuit.

The system is remarkable by the fact that the fuel circuit comprises a buffer tank to supply the turbine engine and a plurality of compression modules configured to supply the buffer tank, each compression module comprising:
- an elementary tank of fixed volume,
- an elementary heat source configured to increase the temperature of the fuel in the elementary tank in an isochoric manner,
- an inlet valve connecting the elementary tank to an upstream part of the fuel circuit,
- an outlet valve connecting the elementary tank to the buffer tank and
- a degassing valve connecting the elementary tank to the cryogenic tank by a return circuit in which circulates a gaseous flow.

The compression is performed in an isochoric manner and not only mechanically, which makes it possible to eliminate the aforementioned drawbacks relating to a mechanical pump. Further, such an isochoric compression makes it possible to take advantage of elementary heat sources that are available in an aeronautical environment to heat the flow of cryogenically stored fuel. When degassing an elementary tank, the gaseous flow expands in an isenthalpic manner in the cryogenic tank, which makes it possible to balance the pressures to enable a new cycle of use in complete safety. The degassing makes it possible to reduce the pressure in order to allow filling of the elementary tanks from the low pressure cryogenic tank without resorting to a high pressure pump. Further, a return circuit makes it possible to maintain a sufficient pressure in the cryogenic tank to supply the elementary tanks even when the fuel level decreases over time in the cryogenic tank.

The use of a buffer tank makes it possible to provide flexibility for the turbine engine, which permanently has fuel at a temperature and pressure close to the optimal injection conditions. Such a buffer tank further makes it possible to be filled in a progressive manner overtime following isochoric compression.

Preferably, the compression modules are mounted in parallel so as to use in an independent manner various elementary heat sources. Preferably, the conditioning system comprises at least four compression modules to make it possible to be used in a phase-shifted manner.

Preferably, each elementary heat source provides calories stemming from the turbine engine and/or the aircraft. Thus, the energy provided comes from available heat sources and is not generated only for the isochoric compression, which improves the energy balance.

According to a particular aspect, at least one compression module comprises at least two elementary tanks mounted in series so as to realize compression stages. Each compression module makes it possible to perform a progressive compression, which makes it possible to reduce the volume of the elementary tanks.

According to another particular aspect, at least one compression module comprises a delivery valve configured to increase the pressure in the elementary tank by communicating the elementary tank with the buffer tank. Thus, the pressurization may be carried out preliminarily for the fuel flow at the outlet of the buffer tank then the pressurization may be finalized by isochoric compression. Such a compression module is advantageous when the power of the elementary source is not capable on its own of ensuring the pressure build-up. Such a compression module is further advantageous when the fuel is taken downstream of an exchanger having a significant heat source, in particular stemming from the turbine engine.

Preferably, the conditioning system comprises at least one first exchanger configured to take calories from the gaseous flow circulating in the return circuit and to transmit them to the fuel flow.

Preferably, the conditioning system comprises at least one second exchanger, upstream of the compression modules, configured to take calories from a heat source and to transmit them to the fuel flow. Such a second heat exchanger is advantageous for making the fuel flow gaseous in the compression modules. Preferably, the heat source of the second exchanger is a fuel flow taken downstream of the buffer tank, preferably downstream of a third exchanger. An input of heat by the heated fuel makes it possible to avoid any condensation that could occur with an air flow.

Preferably, the conditioning system comprises at least one third exchanger, downstream of the compression modules, configured to take calories from a heat source and to transmit them to the fuel flow prior to its injection into the turbine engine.

Preferably, the conditioning system comprises at least one make-up mechanical pump mounted upstream of the compression modules so as to adapt the thermodynamic state of the fuel flow at the inlet of the compression modules.

Preferably, the conditioning system comprises a discharge circuit of a gaseous flow stemming from the cryogenic tank and a discharge member, positioned upstream of the compression modules, configured to enrich the fuel flow with the gaseous flow. Thus, any overpressure in the cryogenic tank is avoided and the gaseous flow indirectly contributes to the supply of the buffer tank.

Preferably, the discharge member is a jet pump, the structure of which is simple and lacking a moving mechanical part.

Preferably, the conditioning system comprises a circuit for injecting a gaseous flow stemming from the cryogenic tank into the buffer tank, the injection circuit comprising at least one isochoric compression module. Thus, the gaseous flow directly contributes to the supply of the buffer tank. A discharge circuit and an injection circuit may be used cumulatively or alternatively.

The invention also relates to an assembly of at least one cryogenic tank, an aircraft turbine engine, and a conditioning system, such as presented previously, fluidically connecting the cryogenic tank and the aircraft turbine engine.

The invention also relates to a method for conditioning fuel of an aircraft turbine engine from fuel stemming from a cryogenic tank by means of a conditioning system, such as presented previously, method wherein:
- the compression modules perform an isochoric compression of the fuel flow stemming from the cryogenic tank to supply the buffer tank, and
- the buffer tank supplies the turbine engine with a flow of fuel.

Preferably, at least two compression modules are controlled in a phase-shifted manner to supply the buffer tank in order to enable continuous supply.

Preferably, the method comprises steps of filling, isochoric compression, expansion and degassing for each compression module. According to one aspect of the invention, the steps are carried out in a phase-shifted manner for at least two compression modules. According to another aspect of the invention, the steps are performed simultaneously for at least two compression modules.

DESCRIPTION OF THE DRAWINGS

The invention will be better understood upon reading the following description, given as an example, and referring to the following figures, given as non-limiting examples, in which identical references are given to similar objects.

It should be noted that the figures set out the invention in detail in order to implement the invention, said figures may of course be used to better define the invention where applicable.

DETAILED DESCRIPTION

Figure 2:
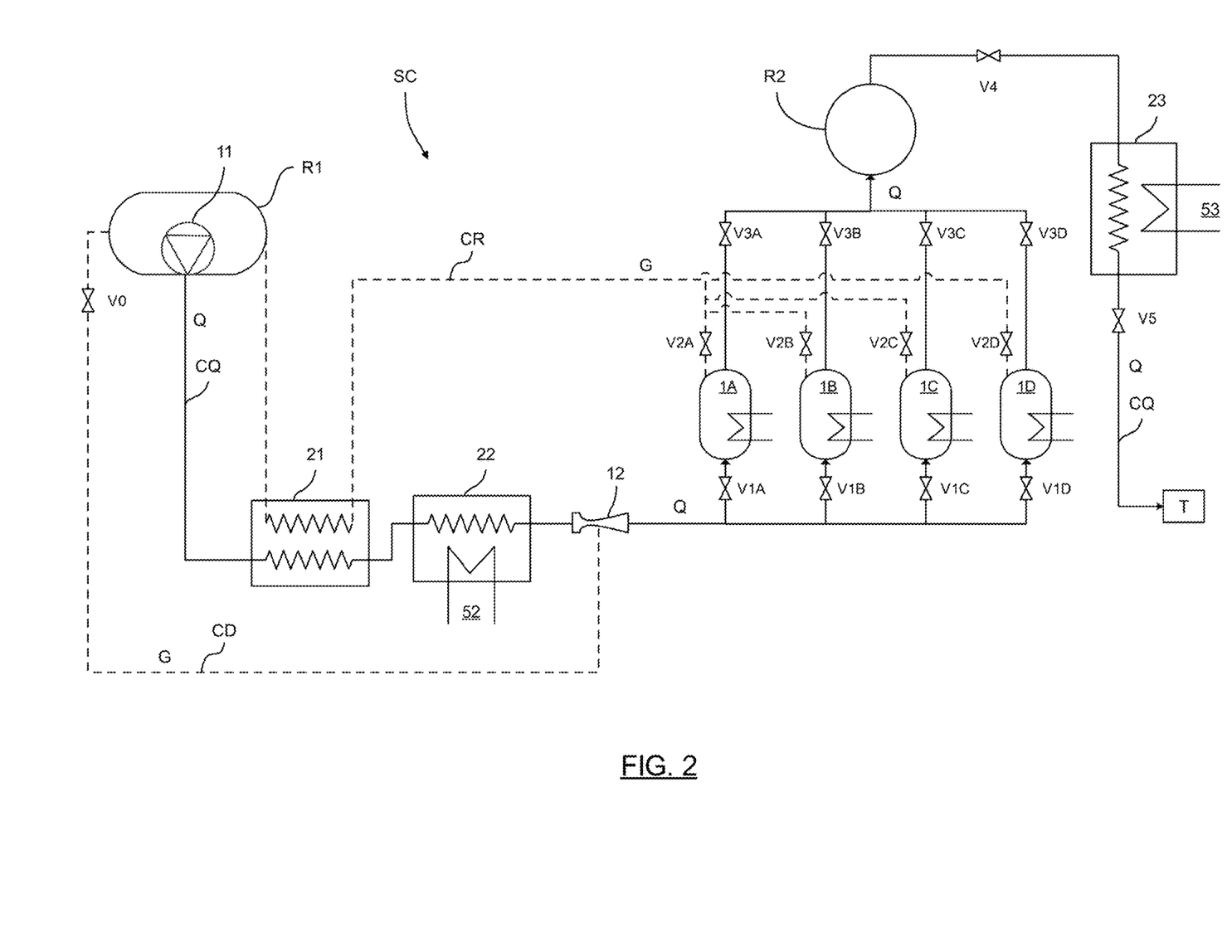
FIG. 2 is a schematic representation of a fuel conditioning system according to a first embodiment of the invention.

With reference to FIG. 2, a fuel conditioning system SC configured to supply an aircraft turbine engine T from fuel stemming from a cryogenic tank R1 is shown.

In this example, the fuel is liquid hydrogen but the invention applies to other types of fuel, for example, liquid methane or liquefied natural gas.

According to a first embodiment, with reference to FIG. 2, the conditioning system SC comprises a fuel circuit CQ (continuous line in FIG. 2) connected at the inlet to the cryogenic tank R1 and at the outlet to the turbine engine T. A fuel flow Q circulates from upstream and downstream in the fuel circuit CQ in order to increase the pressure and temperature to be able to be injected into the combustion chamber of the turbine engine T without the risk of icing up the fuel injectors.

The fuel circuit QC comprises a buffer tank R2 to supply the turbine engine T, in particular to meet the variable needs of the turbine engine T. In other words, the buffer tank R2 makes it possible to ensure a continuous pressurized throughput that is routed to the turbine engine T. In the following, "upstream fuel circuit" is taken to mean the fuel circuit situated upstream of the buffer tank R2 and "downstream fuel circuit" is taken to mean the fuel circuit situated downstream of the buffer tank R2.

Figure 3:
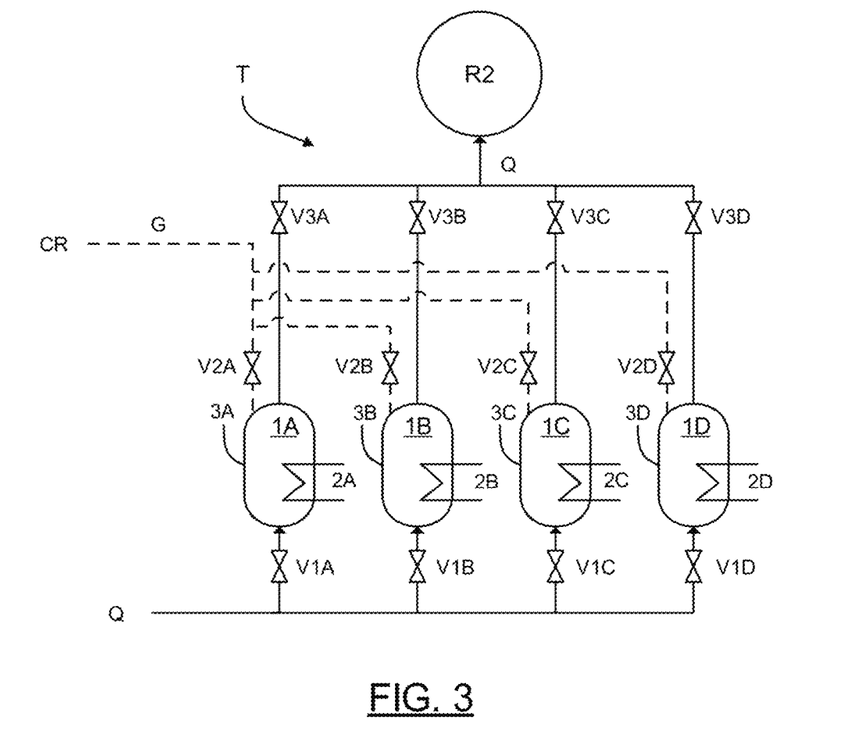
FIG. 3 is a close-up schematic representation of the compression modules of the conditioning system of FIG. 2.

According to the invention, the fuel circuit CQ comprises a plurality of compression modules 1A-1D configured to supply the buffer tank R2. In other words, the compression modules 1A-1D are positioned in the upstream fuel circuit as illustrated in FIG. 2. With reference to FIG. 3 showing a close-up view, each compression module 1A-1D comprises:
- an elementary tank 3A-3D of fixed volume,
- an elementary heat source 2A-2D configured to increase the temperature of the fuel in the elementary tank 3A-3D in an isochoric manner,
- an inlet valve V1A-V1D connecting the elementary tank 3A-3D to an upstream part of the fuel circuit CQ,
- an outlet valve V3A-V3D connecting the elementary tank 3A-3D to the buffer tank R2 and
- a degassing valve V2A-V2D connecting the elementary tank 3A-3D to the cryogenic tank R1 by a return circuit CR in which circulates a gaseous fuel flow, designated gaseous flow G.

Thanks to the invention, it is not necessary to use exclusively a mechanical pump, not very efficient in a cryogenic context, to increase the fuel pressure. An isochoric compression from a plurality of heat sources 2A-2D makes it possible to heat a plurality of elementary volumes in order to increase the pressure of the fuel that supplies the buffer tank R2. The drawbacks of a mechanical pump (sealing, lubrication and efficiency) are advantageously eliminated. In addition, the low fuel temperature and the presence of various elementary heat sources are taken advantage of to achieve an efficient and economical isochoric compression.

The elementary heat sources 2A-2D stem from the aircraft and/or the turbine engine T and may be of different natures. The calories may come from, for example, the lubricating oil, the turbine of the turbine engine T, the cabin air, electrical and electronic systems and/or an independent heating system integrated into the aircraft.

The inlet valves V1A-V1D make it possible to control the throughput of the fuel flow Q entering the elementary tanks 3A-3D. The outlet valves V3A-V3D are of the expansion valve type and allow the fuel flow Q to be expanded after its isochoric compression in the buffer tank R2. The degassing valves V2A-V2D are also of the expander type and ensure the degassing of the elementary tanks 3A-3D to the cryogenic tank R1. Indeed, at the end of the expansion phase, an elementary tank 3A-3D must be degassed to reduce its pressure in order to be able to be filled again. Preferably, in order to control the degassing, the valves are controllable and connected to a control module (not shown) which makes it possible to control their degree of opening and their activation notably in a sequenced manner.

With reference to FIG. 2, the return circuit CR allows the gaseous flow G to be returned to the cryogenic tank R1 to increase the gaseous ceiling in the cryogenic tank R1, which results in an increase in pressure in the latter. In order to limit the pressure in the cryogenic tank R1, the conditioning system SC comprises a discharge circuit CD which connects an upper part of the cryogenic tank R1 to a discharge member 12 making it possible to inject the gaseous flow G into the fuel circuit CQ upstream of the compression modules 1A-1D. The discharge circuit CD comprises a discharge valve VO which is activated from a predetermined pressure threshold in the cryogenic tank R1 making it possible to evacuate a secondary throughput comprising the gaseous fuel flow G.

In practice, the discharge member 12 makes it possible to draw a gaseous flow G when a main throughput of liquid-phase fuel is taken from a lower part of the cryogenic tank R1. In this example, the discharge member 12 is in the form of a jet pump which, by Venturi effect, makes it possible to convert the pressure energy of the liquid fuel flow Q (main throughput) into kinetic energy to drive a gaseous fuel flow Q (secondary throughput). Such a jet pump is also referred to as a Venturi pump. With reference to FIG. 2, the jet pump has a nozzle of convergent-divergent shape (from upstream to downstream) in order to convert the pressure energy into kinetic energy and then inversely convert the kinetic energy into pressure energy. A jet pump does not comprise any mechanical drive and does not have the faults of a mechanical pump described above. It goes without saying that the discharge member 12 could present itself in other forms, for example, a combination of an exchanger and a valve in order to liquefy the gaseous flow before its injection with the liquid fuel flow Q. The discharge member 12 is preferably passive and thus does not comprise a rotating member.

The pressure build-up of the fuel flow Q by isochoric compression is carried out in the compression modules 1A-1D mounted in parallel in such a way that each performs an independent pressure build-up. In this example, four compression modules 1A-1D have been presented, but it goes without saying that their number could be different depending on different factors such as the size of the elementary tanks 3A-3D, the power of the elementary heat sources 2A-2D, the filling time, the compression time, the expansion time and the degassing time. As will be presented later, the buffer tank R2 is supplied by the elementary tanks 3A-3D and has a pressure lower than that reached in the elementary tanks 3A-3D at the end of the compression phase.

With reference to FIG. 2, in addition to the compression modules 1A-1D, the upstream fuel circuit further comprises a hydraulic booster pump 11, preferably immersed in the cryogenic tank R1, configured to take the fuel in liquid phase and increase the pressure of the fuel flow Q by a few bars, in particular from 1 to 3 bars. The use of a hydraulic booster pump 11, i.e. a low-pressure pump, is less problematic than a high-pressure pump.

With reference to FIG. 2, the fuel circuit CQ comprises, between the hydraulic booster pump 11 and the discharge member 12, a first exchanger 21 and a second exchanger 22 which are mounted in series.

The first exchanger 21 is configured to take calories from the gaseous flow G circulating in the return circuit CR and transmit them to the fuel flow Q. The gaseous flow X is thus cooled before being injected into the cryogenic tank R1 while the fuel flow Q is progressively heated.

The second exchanger 22 is configured to take calories from a heat source 52 and transmit them to the fuel flow Q in order to control its temperature and thermodynamic state (liquid, vapor, diphasic or supercritical) at the inlet of the elementary tanks 3A-3D of the compression modules 1A-1D. Preferably, the second exchanger 22 makes it possible to gasify the fuel flow Q. The influence of the thermodynamic state will be presented hereafter. In the case of a liquid supply at the inlet of the elementary tanks 3A-3D, the second exchanger 22 could be omitted.

Still with reference to FIG. 2, the fuel circuit CQ comprises, downstream of the buffer tank R2, a first control valve V4, a third exchanger 23 and a second control valve V5.

The first control valve V4 is of the expansion valve type, it ensures the stabilization of the pressure at the outlet of the buffer tank R2. The pressure downstream of the first regulation valve V4 is lower than that of the buffer tank R2, and corresponds to that required by the turbine engine T, which varies as a function of the flight phase of the aircraft.

The second control valve V5 is of the expansion type and makes it possible to control the throughput of fuel that is supplied to the turbine engine T. Preferably, the temperature of the fuel flow Q at the inlet of the buffer tank R2 is close to ambient temperature to avoid making its structure heavier through the addition of insulators.

The third exchanger 23, for its part, makes it possible to heat the fuel flow Q from a third heat source 53 prior to its injection. This additional thermal energy allows the temperature of the fuel flow Q to be precisely regulated. In this way, the fuel flow Q is injected at an optimal temperature.

Figure 4A:
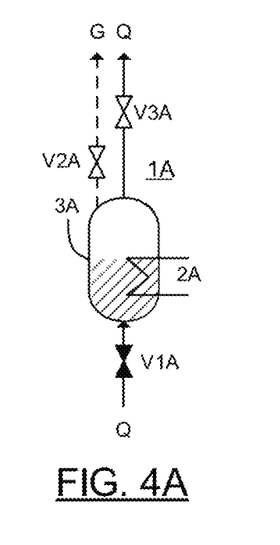
FIG. 4A is a schematic representation of a compression module during a filling step.
Figure 4B:
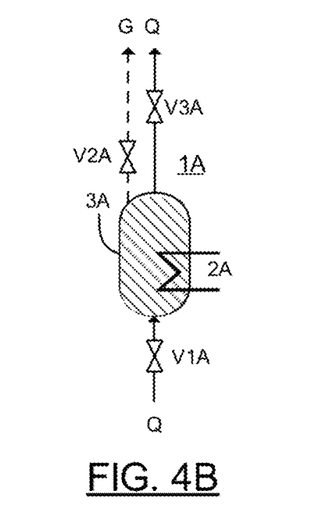
FIG. 4B is a schematic representation of a compression module during an isochoric compression step.
Figure 4C:
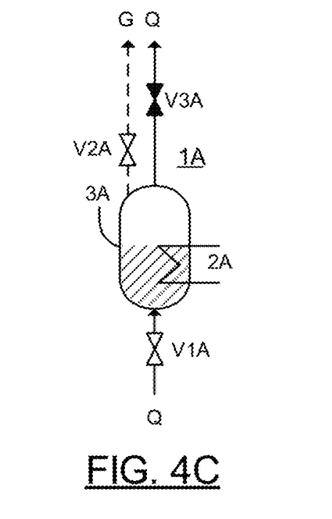
FIG. 4C is a schematic representation of a compression module during an expansion step.
Figure 4D:
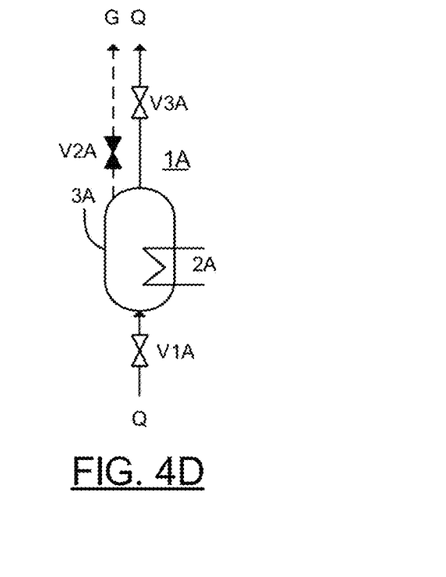
FIG. 4D is a schematic representation of a compression module during a degassing step.

With reference to FIGS. 4A to 4D, different steps of a cycle of use of a compression module 1A-1D will now be presented: filling (FIG. 4A), compression (FIG. 4B), expansion (FIG. 4C) and degassing (FIG. 4D). For the sake of clarity and conciseness, these steps will only be presented in relation to the first compression module 1A. The operation of the other compression modules is analogous and will not be presented in more detail. In this example, a valve in the open position is shown in black in FIGS. 4A to 4D.

During the filling step, with reference to FIG. 4A, the inlet valve V1A is open, the others being closed. The fuel flow Q penetrates into the elementary tank 3A. In practice, the filling step is implemented at a pressure slightly lower than that of the liquid fuel at the outlet of the hydraulic booster pump 11, to the nearest pressure losses.

During the isochoric compression step, with reference to FIG. 4B, all the valves are closed. The elementary heat source 2A supplies calories to the elementary tank 3A, the volume of which remains fixed, which increases the pressure of the fuel flow Q into the elementary tank 3A. Depending on the flight phase of the aircraft, the pressure at the end of compression can reach relatively high values, in particular above 150 bars.

During the expansion step, with reference to FIG. 4C, the outlet valve V3A is open, the others being closed. The fuel flow Q expands in the buffer tank R2. The pressure in the elementary tank 3A drops while the pressure in the buffer tank R2 increases. The pressure in the buffer tank R2 may reach relatively high values, in particular above 100 bars.

During the degassing step, with reference to FIG. 4D, the degassing valve V2A is open, the others being closed. The elementary tank 3A communicates fluidically with the cryogenic tank R1 via the return circuit CR to allow the circulation of the gaseous flow G. The pressure in the elementary tank 3A becomes equal to that of the cryogenic tank R1, of the order of 2 bars. At the end of the degassing step, the degassing valve V2A is closed again and a new cycle can begin.

Figure 5:
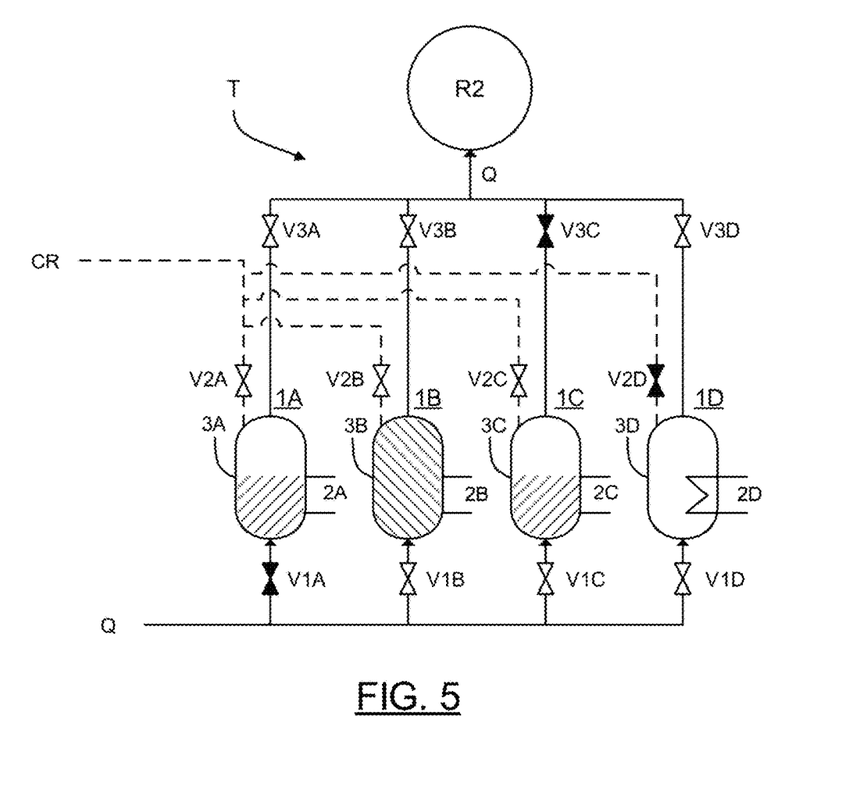
FIG. 5 is a schematic representation of the compression modules of FIG. 3 during different steps.

Thanks to the thermodynamic cycle, each compression module 1A-1D allows a part of the fuel flow Q to be pressurized to fill the buffer tank R2. The use of at least four compression modules 1A-1D in parallel is advantageous for exploiting this 4-stroke cycle. The compression modules 1A-1D are preferably phase-shifted to enable continuous supply to the buffer tank R2. With reference to FIG. 5, at a given time, the first compression module 1A implements the filling step, the second compression module 1B implements the isochoric compression step, the third compression module 1C implements the expansion step, and the fourth compression module 1D implements the degassing step. However, it goes without saying that several compression modules 1A-1D could implement the same steps simultaneously.

Generally, with reference to FIG. 2, the hydraulic booster pump 11 successively supplies the exchangers 21, 22 then the discharge member 12 which makes it possible to inject the gaseous flow G, taken from the upper part of the cryogenic tank R1, with the fuel flow G taken from the lower part of the cryogenic tank R1. The fuel flow Q, here enriched with a gaseous flow G, is introduced into the compression modules 1A-1D which pressurize the fuel flow Q and fill the buffer tank R2. The gaseous flow G from the compression modules 1A-1D is reinjected into the cryogenic tank R1 while passing through the first exchanger 21.

Depending on the needs of the turbine engine T, a fuel flow G is taken from the buffer tank R2 then heated in advance by the third exchanger 23 to its optimum temperature for injection. The presence of a buffer tank R2 makes it possible to ensure flexibility during operation.

The compression modules 1A-1D may be supplied according to different thermodynamic states. In the following, P and T designate the pressure and temperature of the fuel flow Q at the inlet of the compression modules 1A-1D. Pc and Tc designate the critical pressure and the critical temperature of the fuel in question.

The supply may be made from a fuel flow Q in subcritical regime (P<Pc and T<Tc) in liquid state (vapor titer<1), diphasic (0<vapor titer<1) or vapor (vapor titer>1) state. In these cases, the hydraulic booster pump 11 is sufficient to route the fuel flow Q (initially in the subcritical liquid state) from the main tank R1 to the elementary tanks 3A-3D.

Figure 6:
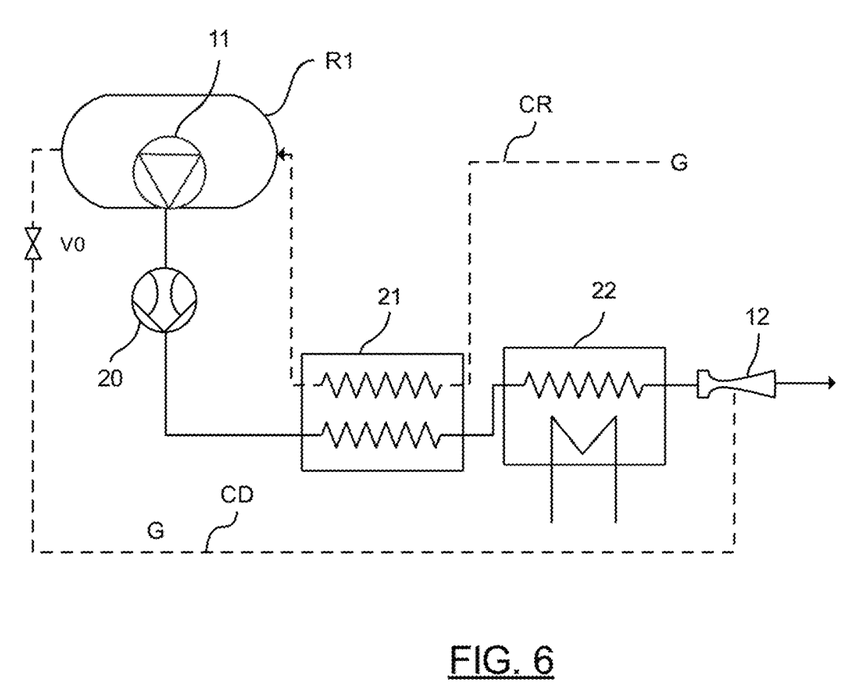
FIG. 6 is a schematic representation of a fuel conditioning system according to a second embodiment of the invention with a make-up mechanical pump.

The supply may be made from a fuel flow Q of compressed liquid (P>Pc and T<Tc), or supercritical (P>Pc and T>Tc). In these two cases, with reference to FIG. 6, a make-up mechanical pump 20 is interposed between the hydraulic booster pump 11 and the first exchanger 21, in order to compress the fuel flow Q to a pressure above the critical pressure. The make-up mechanical pump 20 only ensures a part of the compression, of the order of several bars to exceed the critical pressure (to around 13 bars for hydrogen for example), the pressure build-up complement is advantageously ensured by the isochoric compression of the compression modules 1A-1D.

The supply may be made from a fuel flow Q of superheated gas (P<Pc and T>Tc). In the same way as previously, the hydraulic booster pump 11 is sufficient to route the fuel flow Q (initially in the subcritical liquid state) from the main tank R1 to the elementary tanks 3A-3D.

Figure 7:
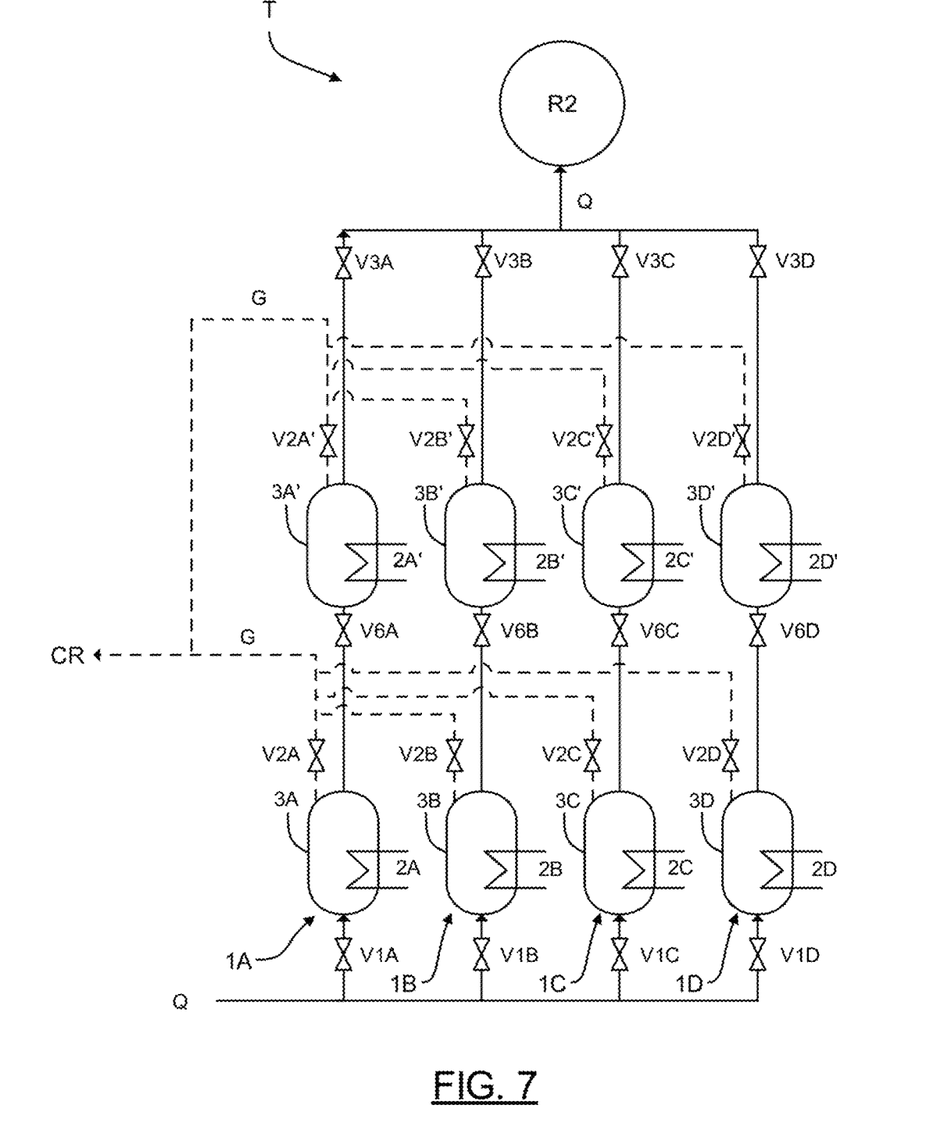
FIG. 7 is a schematic representation of a fuel conditioning system according to a third embodiment of the invention with compression modules comprising elementary tanks in series.

Alternatively, with reference to FIG. 7, each compression module 1A-1D may comprise at least two elementary tanks connected in series. A series arrangement allows a multi-stage compression, each of the elementary tanks corresponding to one compression stage. Such a configuration makes it possible to use smaller elementary tanks to form a more compact conditioning system SC.

With reference to FIG. 7, an example of four compression modules 1A-1D is shown, each comprising:
- a first elementary tank 3A-3D with an elementary heat source 2A-2D,
- a second elementary tank 3A'-3D' with an elementary heat source 2A'-2D',
- an inlet valve V1A-V1D connecting the first elementary tank 3A-3D to an upstream part of the fuel circuit CQ,
- an outlet valve V3A-V3D connecting the second elementary tank 3A'-3D' to the buffer tank R2,
- a first degassing valve V2A-V2D connecting the first elementary tank 3A-3D to the cryogenic tank R1 by a return circuit CR,
- a second degassing valve V2A'-V2D' connecting the second elementary tank 3A'-3D' to the cryogenic tank R1 by the return circuit CR,
- a link valve V6A-V6D connecting in series the first elementary tank 3A-3D and the second elementary tank 3A'-3D'.

Thus, for each compression module 1A-1D, the fuel flow Q is pressurized in a first elementary tank 3A-3D then pressurized in a second elementary tank 3A'-3D'.

Figure 8:
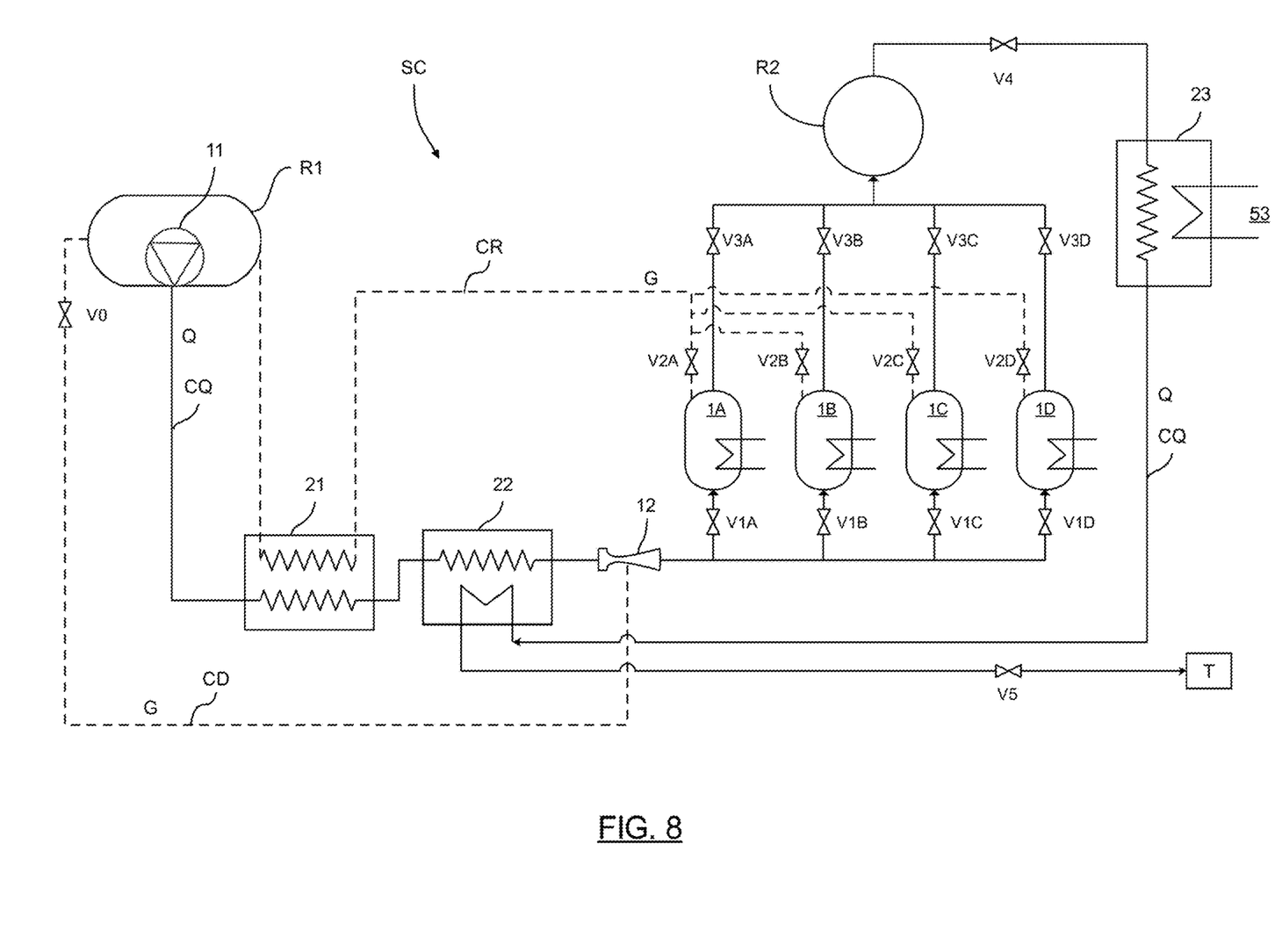
FIG. 8 is a schematic representation of a fuel conditioning system according to a fourth embodiment of the invention with an input of calories by the fuel flow at the outlet of the fuel circuit.

According to one alternative of the invention, with reference to FIG. 8, the second exchanger 22 takes calories from the fuel circuit CQ downstream of the buffer tank R2 (in the downstream fuel circuit) in order to heat the fuel flow Q at the outlet of the cryogenic tank R1. The use of a hot fuel flow Q as a heat source instead of a hot air flow makes it possible to prevent condensation and/or icing in the second exchanger 22.

Figure 9:
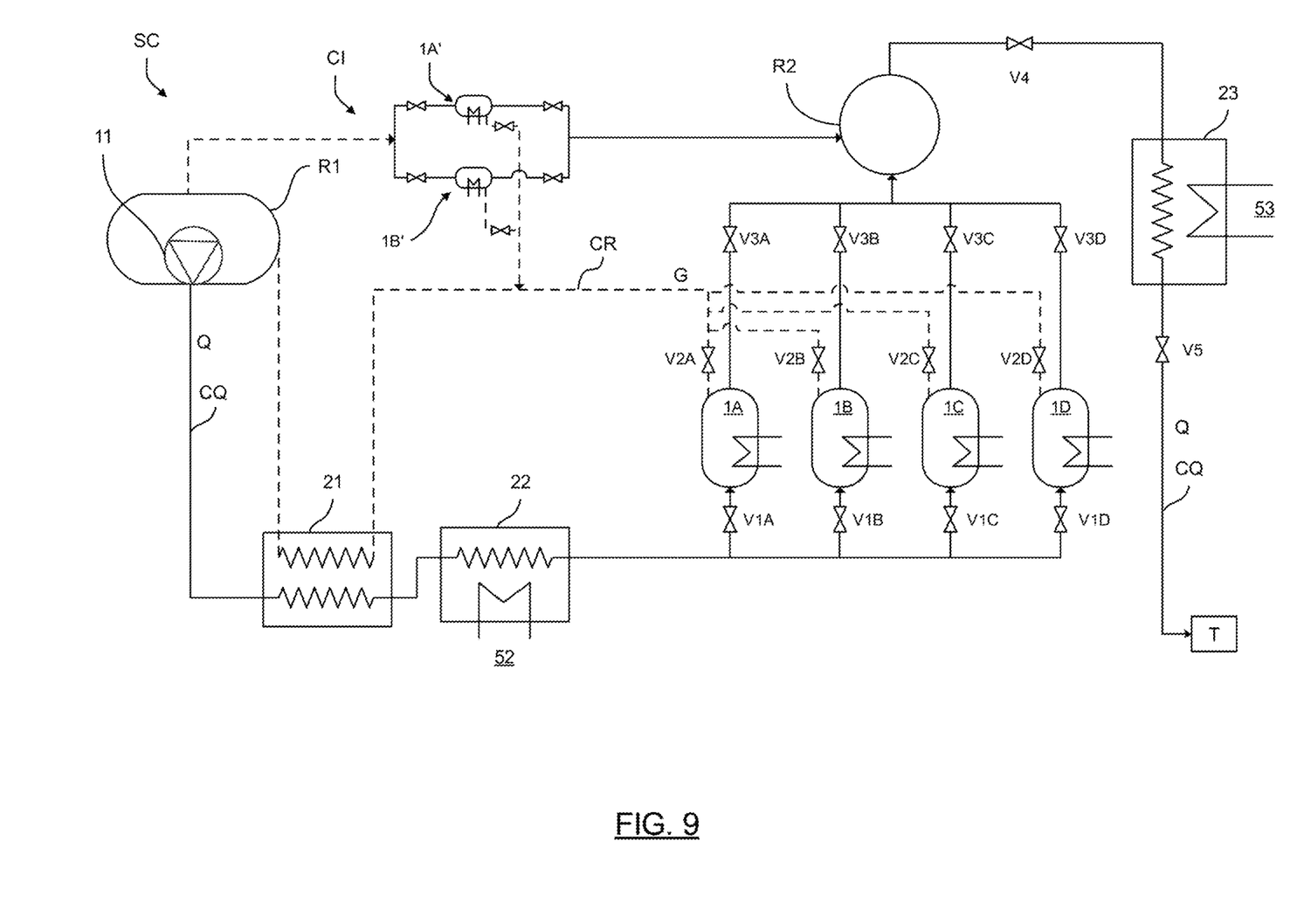
FIG. 9 is a schematic representation of a fuel conditioning system according to a fifth embodiment of the invention with a gaseous fuel injection circuit.

According to another alternative of the invention, with reference to FIG. 9, alternatively or cumulatively to a discharge member 12 to consume the excess gaseous flow G in the cryogenic tank R1, the conditioning system SC comprises an injection circuit CI connecting the cryogenic tank R1, the buffer tank R2 and the return circuit CR. The injection circuit C in this example comprises two compression modules 1A', 1B' of structure analogous to previously to supply the buffer tank R2 directly with the gaseous flow G from the cryogenic tank R1.

Each compression module 1A', 1B' allows the intake of a gaseous flow G from the cryogenic tank R1 into an elementary tank in order to be pressurized to supply the buffer tank R2. The gaseous flow G from the degassing of the compression modules 1A', 1B' is introduced into the return circuit CR in order to be cooled by the first exchanger 21 before being reintroduced into the cryogenic tank R1. The buffer tank R2 may thus be supplied by the liquid phase and the gaseous phase of the fuel of the cryogenic tank R1.

Such an injection circuit CI is advantageous when a discharge member 12 is not capable of eliminating all the gaseous overpressure by Venturi effect.

Figure 10:
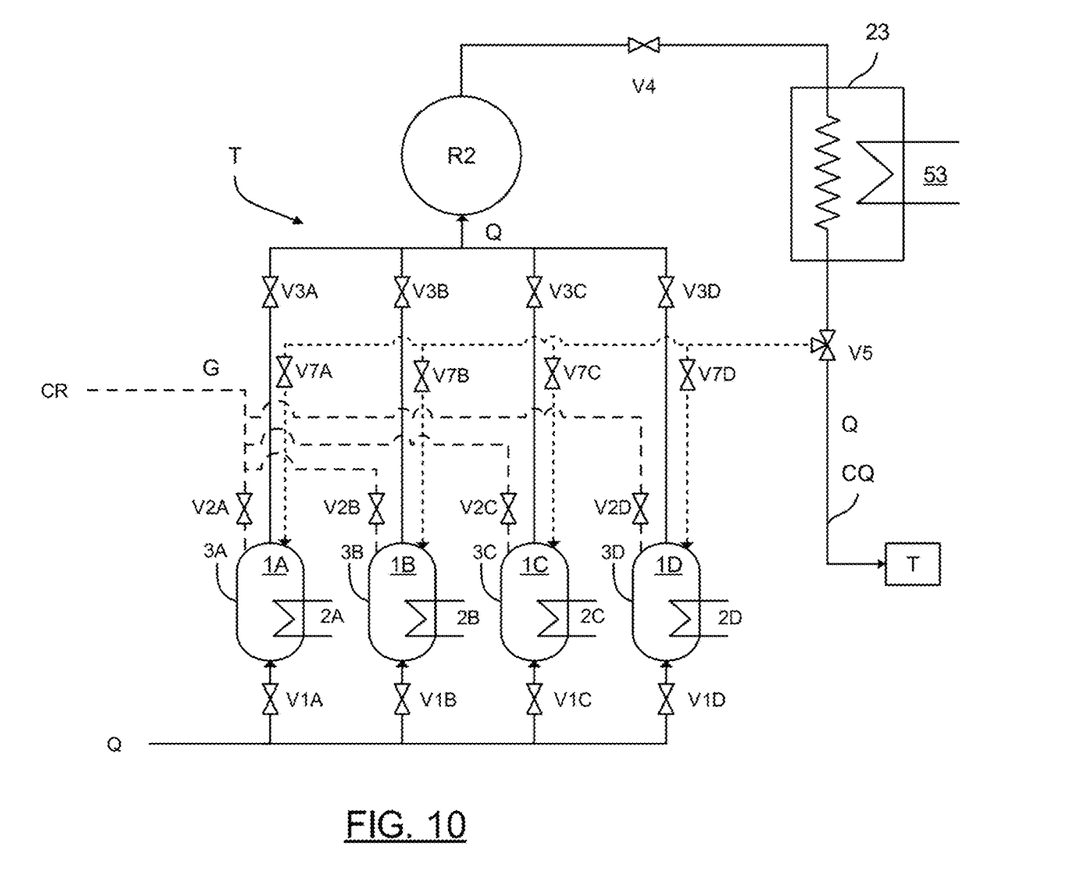
FIG. 10 is a schematic representation of a fuel conditioning system according to a sixth embodiment of the invention wherein each compression module comprises a delivery valve.

According to another alternative of the invention, with reference to FIG. 10, the pressure build-up in a compression module 1A-1D is carried out by injection of fuel taken downstream of the buffer tank R2, in other words by a heated fuel flow. To this end, each compression module 1A-1D comprises a delivery valve V7A-V7D that takes a fuel flow at the level of the second control valve V5, which is a three-way valve in this alternative. For such a configuration, the steps of filling, expansion and degassing are identical and will not be presented again.

During the isochoric compression step, firstly all the valves are closed except for the delivery valve V7A-V7D so that the pressure in the buffer tank R2 equalizes with that of the elementary tank 3A-3D. Thus, the supply valve V7A-V7D enables a first pressurization. Secondly, all the valves are closed and the elementary heat source 2A-2D supplies calories to the elementary tank 3A-3D of which the volume remains fixed, which increases the pressure of the fuel flow Q in the elementary tank 3A-3D. In other words, a second pressurization is performed by heat input. Such an alternative is particularly advantageous when the elementary sources 2A-2D alone are not capable of ensuring all the pressure build-up in the elementary tanks 3A-3D, for example, when the elementary tanks 3A-3D are positioned away from the elementary sources 2A-2D and the third exchanger 23 is close to the turbine engine T and has a significant heat source making it possible to bring thermal energy to the fuel flow Q in an optimal manner.

The invention claimed is:

1. A fuel conditioning system configured to supply an aircraft turbine engine of an aircraft with fuel stemming from a cryogenic tank, the fuel conditioning system comprising a fuel circuit connected at an inlet to the cryogenic tank and at an outlet to the turbine engine, a fuel flow circulating from upstream to downstream in the fuel circuit, wherein the fuel circuit comprises a buffer tank to supply the turbine engine and a plurality of compression modules configured to supply the buffer tank, each of the compression modules comprising:
- an elementary tank of fixed volume,
- an elementary heat source configured to increase a temperature of the fuel in the elementary tank in an isochoric manner,
- an inlet valve connecting the elementary tank to an upstream part of the fuel circuit,
- an outlet valve connecting the elementary tank to the buffer tank, and
- a degassing valve connecting the elementary tank to the cryogenic tank by a return circuit in which circulates a gaseous flow.

2. The fuel conditioning system according to claim 1, wherein the compression modules are mounted in parallel.

3. The fuel conditioning system according to claim 1, wherein the elementary heat source of each of the compression modules provides calories stemming from at least one of the turbine engine and the aircraft.

4. The fuel conditioning system according to claim 1, wherein at least one compression module comprises at least two elementary tanks mounted in series.

5. The fuel conditioning system according to claim 1, wherein at least one compression module comprises a delivery valve configured to increase a pressure in the elementary tank by communicating the elementary tank with the buffer tank.

6. The fuel conditioning system according to claim 1, comprising at least one first exchanger configured to take calories from the gaseous flow circulating in the return circuit and to transmit them to the fuel flow.

7. The fuel conditioning system according to claim 1, comprising at least one second exchanger, upstream of the compression modules, configured to take calories from a heat source and to transmit them to the fuel flow.

8. The fuel conditioning system according to claim 1, comprising at least one third exchanger, downstream of the compression modules, configured to take calories from a heat source and to transmit them to the fuel flow prior to its injection into the turbine engine.

9. The fuel conditioning system according to claim 1, comprising at least one make-up mechanical pump mounted upstream of the compression modules.

10. The fuel conditioning system according to claim 1, comprising a discharge circuit of a gaseous flow stemming from the cryogenic tank and a discharge member, positioned upstream of the compression modules, configured to enrich the fuel flow with the gaseous flow.

11. The fuel conditioning system according to claim 1, comprising an injection circuit of the gaseous flow stemming from the cryogenic tank into the buffer tank, the injection circuit comprising at least one isochoric compression module.

12. An assembly of the at least one cryogenic tank, the aircraft turbine engine and the fuel conditioning system according to claim 1, wherein the cryogenic tank and the aircraft turbine engine are fluidically connected.

13. A method for conditioning fuel of an aircraft turbine engine from fuel stemming from the cryogenic tank by means of the fuel conditioning system according to claim 1, method wherein:
- the compression modules perform an isochoric compression of the fuel flow stemming from the cryogenic tank to supply the buffer tank, and
- the buffer tank supplies the turbine engine with the fuel flow.

14. The fuel conditioning method according to claim 13, wherein at least two of the compression modules are controlled in a phase-shifted manner.

15. The fuel conditioning method according to claim 13, the method comprising the steps of filling, isochoric compression, expansion, and degassing for each of the compression modules.

* * * * *